United States Patent [19]

Otto et al.

[11] Patent Number: 5,618,995
[45] Date of Patent: Apr. 8, 1997

[54] VEHICLE VIBRATION SIMULATOR

[75] Inventors: Norman C. Otto, Plymouth; William J. Pielemeier, Ypsilanti; Raymond C. Meier, Jr., Canton, all of Mich.

[73] Assignee: Ford Motor Company, Dearborn, Mich.

[21] Appl. No.: 498,451

[22] Filed: Jul. 5, 1995

[51] Int. Cl.⁶ .............................. G01M 17/00; G09B 9/04
[52] U.S. Cl. ...................................... 73/669; 434/62
[58] Field of Search .......................... 73/662, 663, 664, 73/665, 669, 865.6; 254/93 VA; 434/67, 62; 446/7; 472/135, 95, 96, 101

[56] References Cited

U.S. PATENT DOCUMENTS

| | | | |
|---|---|---|---|
| 3,827,289 | 8/1974 | Borg | 73/71.7 |
| 3,984,924 | 10/1976 | Myles et al. | 434/29 |
| 4,112,776 | 9/1978 | Ouellette et al. | 73/665 |
| 4,181,028 | 1/1980 | Talbott, Jr. | 73/665 |
| 4,181,029 | 1/1980 | Talbott, Jr. | 73/665 |
| 4,422,334 | 12/1983 | Yasuda | 73/665 |
| 4,446,742 | 5/1984 | Thompson, Jr. et al. | 73/663 |
| 4,658,656 | 4/1987 | Haeg | 73/669 |
| 4,875,374 | 10/1989 | Pinson | 73/663 |
| 4,978,299 | 12/1990 | Denne | 434/58 |
| 5,018,973 | 6/1991 | Alet et al. | 434/62 |
| 5,199,875 | 4/1993 | Trumbull | 434/62 |
| 5,277,584 | 1/1994 | DeGroat et al. | 434/29 |
| 5,291,787 | 3/1994 | Laforest et al. | 73/663 |
| 5,372,505 | 12/1994 | Smith | 434/67 |

Primary Examiner—Hezron E. Williams
Assistant Examiner—Richard A. Moller
Attorney, Agent, or Firm—Joseph W. Malleck, Esq.; Roger L. May, Esq.

[57] ABSTRACT

A vehicle vibration simulator to simulate occupant exposure to vibration in a motor vehicle includes a reaction mass, a seat portion, a seat actuator between the reaction mass and the seat portion for providing at least one degree of vibration freedom, a steering column portion, a steering column actuator between the reaction mass and the steering column portion for providing at least one degree of vibration freedom, a floorpan portion, a floorpan actuator between the reaction mass and the floorpan portion for providing one degree of vibration freedom, the seat actuator, steering column actuator and floorpan actuator being actuated independently and/or simultaneously to simulate occupant exposure to vehicle vibration.

15 Claims, 2 Drawing Sheets

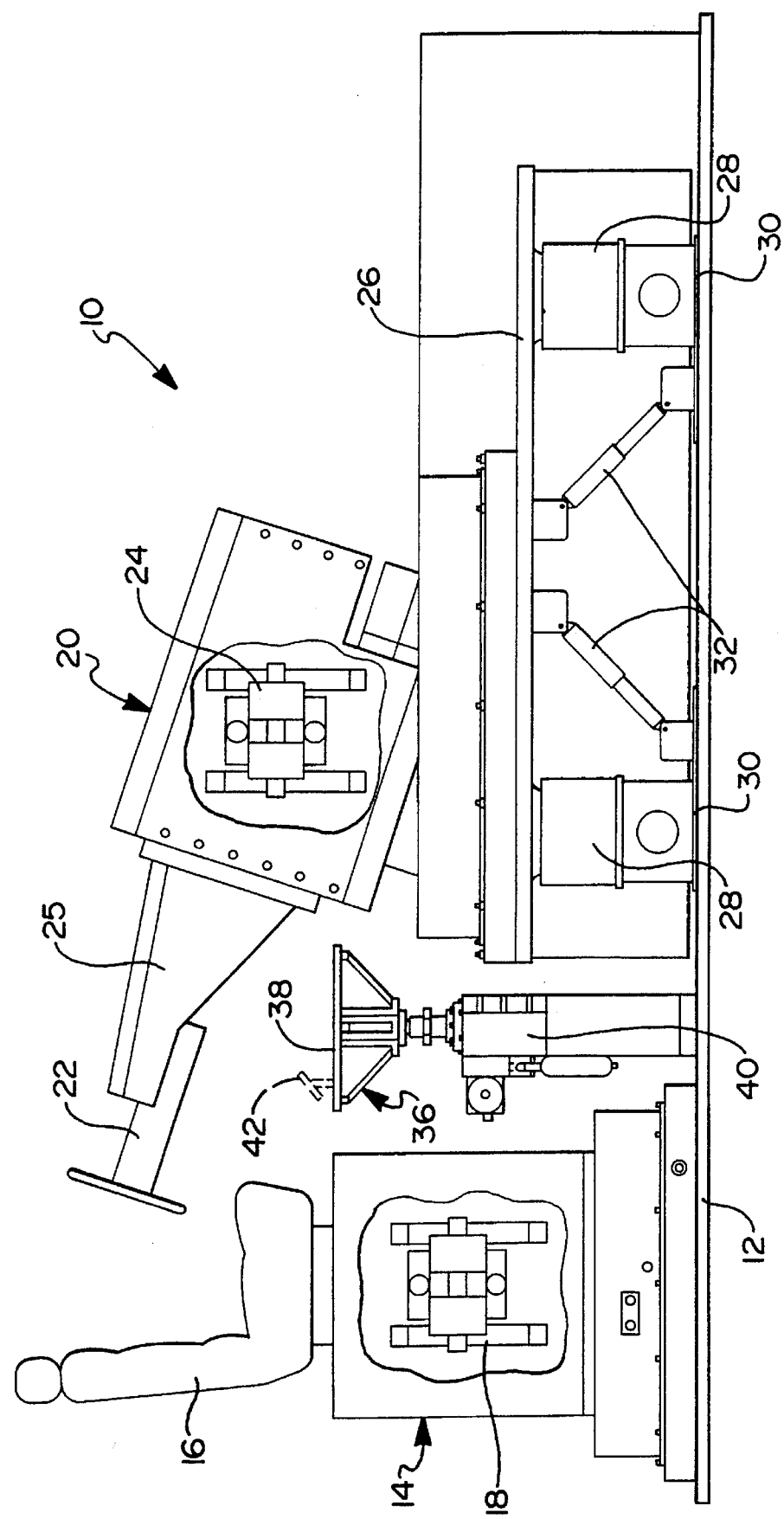

VEHICLE VIBRATION SIMULATOR

BACKGROUND OF THE INVENTION

1. Field of the Invention

The present invention relates generally to vehicle simulators and, more specifically, to a vehicle vibration simulator to simulate occupant exposure to vibration in a motor vehicle.

2. Description of the Related Art

It is known to use human subjective testing for vibration of vehicles such as motor vehicles. Many studies have been performed to determine the effect of vehicle vibration on occupant ride comfort. These data have been obtained with different motor vehicles operated over a test track or specific road surfaces or city streets. These data have been shown to be subject to both bias and variability which make it difficult to obtain representative and repeatable data.

One attempt to overcome disadvantages in the vehicle studies has been to provide general vehicle driving simulators. However, these vehicle driving simulators focus on overall vehicle steering dynamics and visual simulation rather than vibration. The motion capabilities of these vehicle driving simulators apply to the vehicle as a whole, with no independent control of seat, floorpan, steering wheel. Also, these driving simulators are aimed at reproducing steering and suspension dynamics, with response up to five Hertz (5 Hz), rather than total vehicle vibration simulation. Further, these vehicle driving simulators may use vibration motors to excite the base and overall frame of the simulator but are not controlled to excite multiple components in specific translational or rotational directions.

SUMMARY OF THE INVENTION

Accordingly, the present invention is a vehicle vibration simulator to simulate occupant exposure to vibration in a motor vehicle including a reaction mass, a seat portion, a seat actuator between the reaction mass and the seat portion for providing at least one degree of vibration freedom, a steering column portion, a steering column actuator between the reaction mass and the steering column portion for providing at least one degree of vibration freedom, a floorpan portion, a floorpan actuator between the reaction mass and the floorpan portion for providing one degree of vibration freedom, the seat actuator, steering column actuator and floorpan actuator being actuated independently and/or simultaneously to simulate occupant exposure to vehicle vibration.

One advantage of the present invention is that a vehicle vibration simulator is provided for simulating occupant exposure to vibration in a motor vehicle. Another advantage of the present invention is that the vehicle vibration simulator independently and/or simultaneously simulates human exposure to vehicle vibration along multiple axes of a seat, floorpan, brake and accelerator pedal, gearshift lever, and steering wheel. Yet another advantage of the present invention is that the vehicle vibration simulator applies vibration only at points of contact with the occupant and does not vibrate an actual or entire vehicle at wheels or spindles. Still another advantage of the present invention is that the vehicle vibration simulator is capable of reproducing vibration profiles recorded in actual motor vehicles as well as synthetic test signals. A further advantage of the present invention is that the vehicle vibration simulator allows psychophysical testing of occupant response to vibration in motor vehicles involving multiple simultaneous inputs. Yet a further advantage of the present invention is that the vehicle vibration simulator covers a large frequency range of 0.5 to 200 Hz. A still further advantage of the present invention is that the vehicle vibration simulator provides eleven simultaneous and independent axes of vibration for the seat, floorpan, pedal or gearshift lever and steering wheel, allowing studies of a realistic total environment. Another advantage of the present invention is that individual components (seat, steering wheel, floorpan and pedals) can be replaced, allowing one to determine the effect of the component on the vibration. Yet another advantage of the present invention is that brand bias is eliminated because the test is blind and variability reduced because every occupant is exposed to exactly the same vibration.

Other features and advantages of the present invention will be readily appreciated as the same becomes better understood after reading the subsequent description taken in conjunction with the accompanying drawings.

BRIEF DESCRIPTION OF THE DRAWINGS

FIG. 3 is a plan view of the vehicle vibration simulator of FIG. 1.

DESCRIPTION OF THE PREFERRED EMBODIMENT(S)

Figure 1:
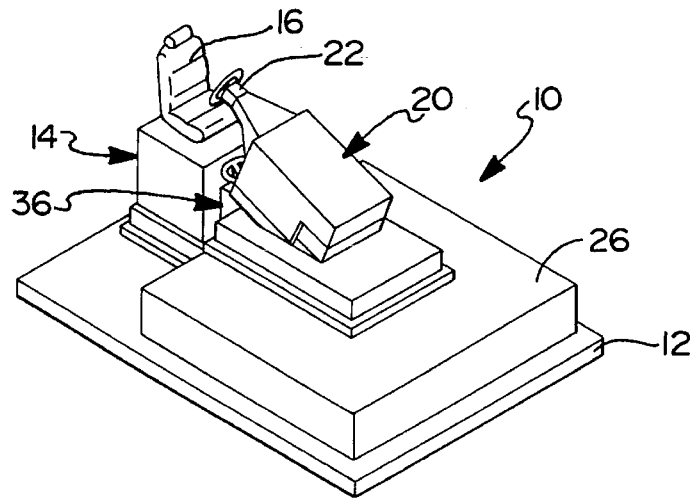
FIG. 1 is a perspective view of a vehicle vibration simulator according to the present invention.
Figure 2:
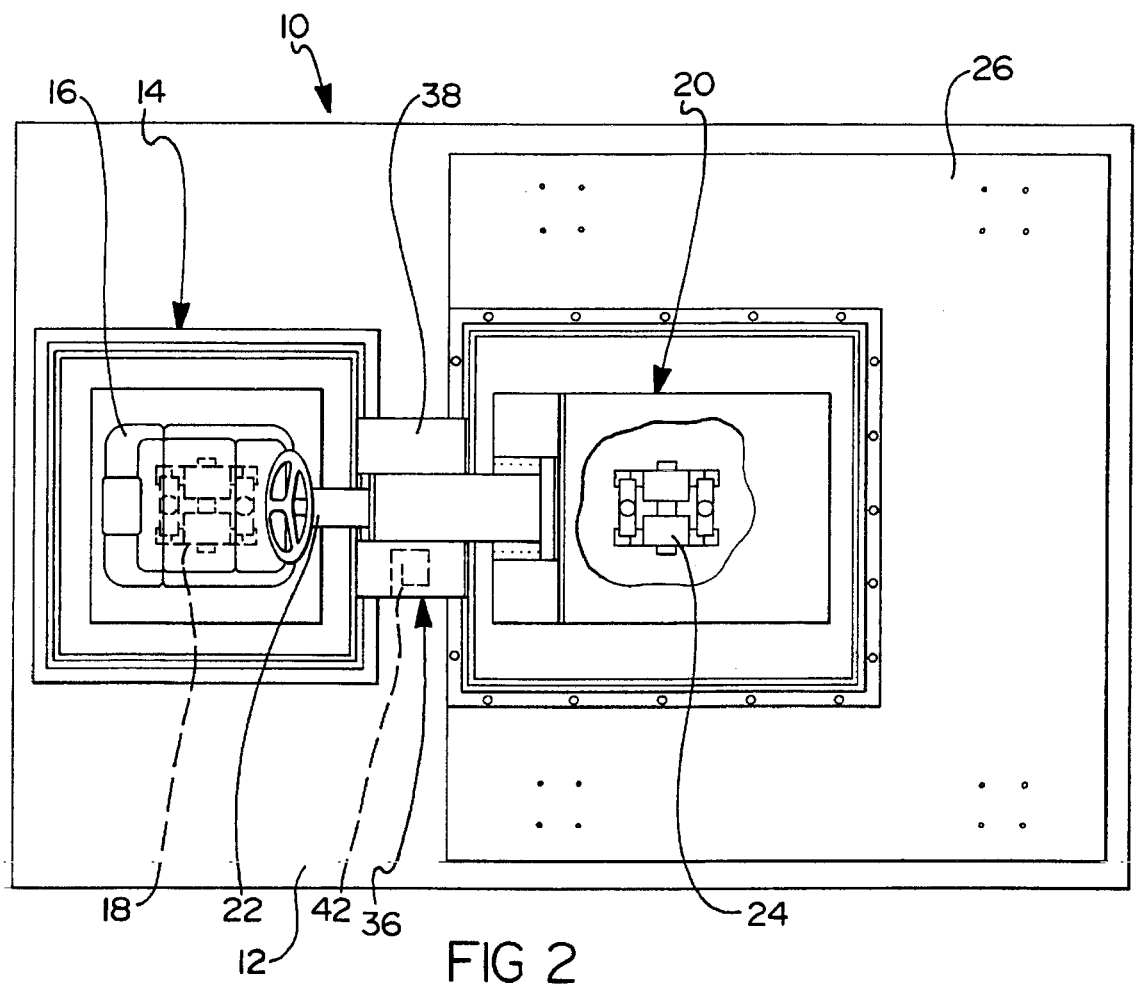
FIG. 2 is an elevational view of the vehicle vibration simulator of FIG. 1.

Referring to the drawings, one embodiment of a vehicle vibration simulator 10 is shown to simulate occupant exposure to vibration in a motor vehicle. The vehicle vibration simulator 10 includes a reaction mass 12 secured by suitable means to a support surface (not shown). The reaction mass 12 may be made of any suitable material, such as concrete, for reacting the forces produced in the simulator. It should be appreciated that the reaction mass 12 supports other components of the vehicle vibration simulator 10 to be described.

The vehicle vibration simulator 10 also includes a seat module, generally indicated at 14, mounted on the reaction mass 12. The seat module 14 includes a seat portion 16 and a seat actuator 18 between the seat portion 16 and the reaction mass 12. The seat portion 16 is removeably secured by suitable means to the seat actuator 18 and the seat actuator 18 is removeably secured by suitable means to the reaction mass 12. Preferably, the seat portion 16 is a seat from a motor vehicle. It should be appreciated that seats from other motor vehicles may be interchanged for comparison when stimulated with the same vibration by the vehicle vibration simulator 10.

The seat actuator 18 has a plurality of hydraulic actuators to provide one to six (6) degrees of freedom of vibration to the seat portion 16. The hydraulic actuators may be actuated independently and/or simultaneously relative to each other to provide three translational axes (X, Y, Z) and three rotational axes (pitch, roll, yaw) of vibration to the seat portion 16. Each hydraulic actuator is capable of providing a displacement up to approximately two (2) inches (±one inch) in its vibration axis over a frequency range of 0.5 to 200 Hz. Each hydraulic actuator is actuated by hydraulic fluid from a hydraulic system (not shown) which is controlled by an electronic controller or central processing unit (not shown). The hydraulic actuators are relatively quiet in their operation and allow the vehicle vibration simulator 10 to be compatible with playback of vehicle audio data related to vehicle vibration to a seated occupant in the vehicle vibration simulator 10 as is known in the art. The seat actuator 18 is commercially available from Team Corporation of Burlington, Wash. It should be appreciated that an occupant sits in the seat portion 16.

The vehicle vibration simulator 10 includes a steering column module, generally indicated at 20, mounted on the reaction mass 12. The steering column module 20 includes a steering column portion 22, a steering column actuator 24 mounted on the steering wheel reaction mass 12, and a steering support 25 interconnecting the steering column portion 22 and the steering column actuator 24 The steering column portion 22 is removeably secured by suitable means to the steering support 25. Preferably, the steering column portion 22 is a steering column from a motor vehicle. It should be appreciated that steering columns from other motor vehicles may be interchanged for comparison when stimulated by the same vibration by the vehicle vibration simulator 10.

The steering column actuator 24 is similar to the seat actuator 18 but has a plurality of hydraulic actuators to provide one (1) to four (4) degrees of freedom of vibration to the steering column portion 22. The hydraulic actuators may be actuated independently and/or simultaneously relative to each other to provide three translational axes (X, Y, Z) and one rotational axis (roll) of vibration to the steering column portion 22. Each hydraulic actuator is actuated by the hydraulic system and electronic controller. The steering column actuator is commercially available from Team Corporation as previously described. It should be appreciated that the seated occupant grips the steering column portion 22.

The vehicle vibration simulator 10 also includes a steering column reaction mass 26 for the steering column actuator 24. The steering column reaction mass 26 may be made of any suitable material, such as concrete, reacting the forces produced by the steering column actuator 24. The vehicle vibration simulator 10 also includes at least one, preferably a plurality of air isolators 28 between the steering column reaction mass 26 and the reaction mass 12. Preferably, the air isolator 28 is disposed near each corner of the steering column reaction mass 26 and connected thereto by suitable means. The vehicle vibration simulator 10 includes at least one, preferably a plurality of gas shock absorbers 32 between the steering column reaction mass 26 and the reaction mass 12.

The vehicle vibration simulator 10 includes a floorpan module, generally indicated at 36, mounted on the reaction mass 12. The floorpan module 36 includes a floorpan portion 38 and a floorpan actuator 40 between the floorpan portion 38 and the reaction mass 12. The floorpan portion 38 is removeably secured by suitable means to the floorpan actuator 40 and the floor pan actuator 40 is removable secured by suitable means to the reaction mass 12. Preferably, the floorpan portion 38 is a floorpan from a motor vehicle. It should be appreciated that floorpans from other motor vehicles may be interchanged for comparison when stimulated by the same vibration.

The floorpan actuator 40 has a single hydraulic actuator to provide one (1) degree of freedom of vibration to the floorpan portion 38. The hydraulic actuator provides one vertical (1) axis of vibration to the floorpan portion 38. The hydraulic actuator is conventional and known in the art. The hydraulic actuator is actuated by the hydraulic system and electronic controller. The floorpan 36 may include a shift lever, brake pedal or accelerator pedal 42 (shown in phantom lines) having an actuator (not shown), to provide one degree of freedom of vibration to each one.

To control the vehicle vibration simulator 10, the electronic controller or central processing unit uses a vibration control program commercially available from Synergistic Technology Incorporated of Santa Clara, Calif. known as the "4th Generation Multiple Exciter Control System". The STI vibration control program is capable of using data gathered from an actual motor vehicle or synthetic test data to control the hydraulic system for actuating the hydraulic actuators. Feedback is provided through control accelerometers connected to the seat module 14, steering column module 30 and floorpan module 36. The electronic controller allows the vehicle vibration simulator 10 to play any number of vibration profiles immediately and consecutively for psychophysical testing. It should be appreciated that the STI vibration control program can control the vibration amplitudes to within ten percent (10%) or less of the values measured on the road.

In operation, an occupant is seated in the seat portion 16 and grips the steering column portion 22 with their feet on the floorpan portion 38. The hydraulic actuators may be actuated simultaneously in phase for translational vibration or out of phase for rotational vibration. The occupant is exposed to vibration and their opinion of such exposure is used for evaluation purposes.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle vibration simulator to simulate occupant exposure to vibration in a motor vehicle comprising:

a reaction mass;

a seat portion;

a seat actuator between said reaction mass and said seat portion for providing at least one degree of vibration freedom;

a steering column portion;

a steering column actuator between said reaction mass and said steering column portion for providing at least one degree of vibration freedom;

a floorpan portion; and a floorpan actuator between said reaction mass and said floorpan portion for providing one degree of vibration freedom, and means for controlling said seat actuator, steering column actuator and floorpan actuator to allow said seat actuator, steering column actuator and floorpan actuator to be individually actuated independently and simultaneously to simulate human exposure to vehicle vibration.

2. A vehicle vibration simulator as set forth in claim 1 including at least one of a group comprising a shift lever, brake pedal and accelerator pedal, and a component actuator between said reaction mass and said at least one of said shift lever, said brake pedal, and said accelerator pedal for providing one degree of vibration freedom.

3. A vehicle vibration simulator as set forth in claim 1 wherein said seat actuator provides three translational and three rotational degrees of vibration freedom to said seat portion.

4. A vehicle vibration simulator as set forth in claim 1 wherein said seat actuator includes a plurality of hydraulic actuators to provide six degrees of vibration freedom to said seat portion.

5. A vehicle vibration simulator as set forth in claim 1 wherein said steering column actuator provides three translational and one rotational degrees of vibration freedom to said steering column portion.

6. A vehicle vibration simulator as set forth in claim 1 wherein said steering column actuator includes a plurality of hydraulic actuators to provide four degrees of vibration freedom to said steering column portion.

7. A vehicle vibration simulator as set forth in claim 1 wherein said floorpan actuator comprises a hydraulic actuator for providing one translational degree of vibration freedom to said floorpan portion.

8. A vehicle vibration simulator as set forth in claim 1 including a steering column reaction mass connected to said steering column actuator and at least one air isolator between said steering column reaction mass and said reaction mass.

9. A vehicle vibration simulator to simulate occupant exposure to vibration in a motor vehicle comprising:

a reaction mass;

a seat portion;

a seat actuator between said reaction mass and said seat portion having a plurality of hydraulic actuators to provide six degrees of vibration freedom to said seat portion;

a steering column portion;

a steering column actuator between said reaction mass and said steering column portion having a plurality of hydraulic actuators to provide four degrees of vibration freedom to said steering column portion;

a floorpan portion; and a floorpan actuator between said reaction mass and said floorpan portion having a hydraulic actuator for providing one translational degree of vibration freedom to said floorpan portion, and means for controlling said seat actuator, steering column actuator and floorpan actuator to allow said seat actuator, steering column actuator and floorpan actuator to be individually actuated independently and simultaneously to simulate human exposure to vehicle vibration.

10. A vehicle vibration simulator as set forth in claim 9 including a steering column reaction mass connected to said steering column actuator and at least one air isolator between said steering column reaction mass and said reaction mass.

11. A vehicle vibration simulator as set forth in claim 9 including at least one of a group comprising a shift lever, brake pedal and accelerator pedal, and a component actuator interconnecting said reaction mass and said at least one of said shift lever, said brake pedal, and said accelerator pedal for providing one degree of vibration freedom.

12. A vehicle vibration simulator to simulate occupant exposure to vibration in a motor vehicle comprising:

a reaction mass;

a seat portion;

a seat actuator between said reaction mass and said seat portion;

a steering column portion;

a steering column actuator between said reaction mass and said steering column portion;

a floorpan portion;

a floorpan actuator between said reaction mass and said floorpan portion, and means for controlling said seat actuator, steering column actuator and floorpan actuator to allow said seat actuator, steering column actuator and floorpan actuator to be individually actuated independently and simultaneously to simulate human exposure to vehicle vibration;

at least one of a group comprising a shift lever, brake pedal and accelerator pedal, and a component actuator between said reaction mass and said at least one of said shift lever, said brake pedal, and said accelerator pedal for providing one degree of vibration freedom;

said seat actuator including a plurality of hydraulic actuators to provide six degrees of vibration freedom to said seat portion;

said steering column actuator including a plurality of hydraulic actuators to provide four degrees of vibration freedom to said steering column portion;

said floorpan actuator including a hydraulic actuator for providing one translational degree of vibration freedom to said floorpan portion; and a steering column reaction mass connected to said steering column actuator and at least one air isolator between said steering column reaction mass and said reaction mass.

13. A vehicle vibration simulator as set forth in claim 12 including means for allowing said seat portion, steering column portion, and floorpan portion to be removed and replaced with another one of said seat portion, steering column portion, and floorpan portion.

14. A vehicle vibration simulator as set forth in claim 12 including means for allowing said seat portion, said steering column portion and said floorpan portion to undergo one or more profiles of vibration immediately and consecutively.

15. A vehicle vibration simulator as set forth in claim 12 wherein said means for controlling said seat actuator, steering column actuator and floorpan actuator controlled by vehicle audio data related to vehicle vibration to a seated occupant.

\* \* \* \* \*